L. S. WHITE.
FURNITURE CASTER.
No. 11,506.
Patented Aug. 8, 1854.
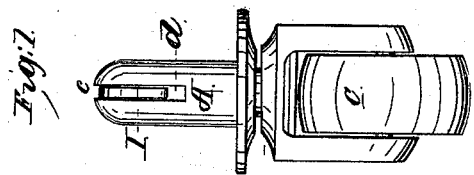
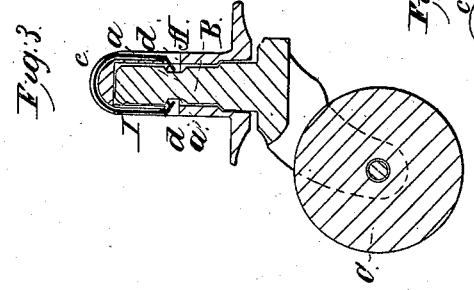
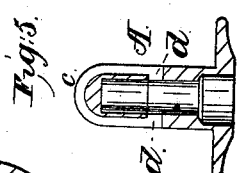
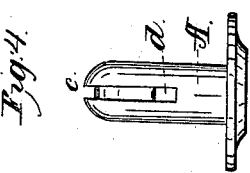
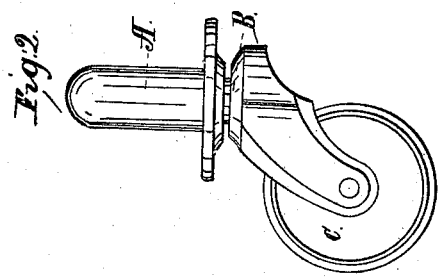

UNITED STATES PATENT OFFICE.

LE ROY S. WHITE, OF CHICOPEE, MASSACHUSETTS, ASSIGNOR TO BENJN. LATHROP AND PHILOS B. TYLER, OF SPRINGFIELD, MASSACHUSETTS.

FURNITURE-CASTER.

Specification of Letters Patent No. 11,506, dated August 8, 1854.

*To all whom it may concern:*

Be it known that I, LE ROY S. WHITE, of Chicopee, in the county of Hampden and State of Massachusetts, have invented a new and useful Improvement in Furniture-Casters; and I hereby declare that the same is fully described and represented in the following specification and the accompanying drawings, letters, figures, and references thereof.

Of the said drawings, Figure 1, represents a front view of my improved furniture caster. Fig. 2, is a side elevation of it. Fig. 3, is a central and longitudinal section of it.

In the said drawings A, denotes the socket tube of the shank of a caster. B, the turning shank of said caster. C is the caster wheel connected to the shank in the usual way.

In applying a caster to any article of furniture, the socket tube is inserted therein and fastened to such article by means of screws. The shank is what is termed a detachable shank, it being formed as represented in the drawings, and with a groove, $a$, extended entirely around it, the upper side of the said groove being made flaring, while the upper end of the shank is beveled, the said flare of the side of the groove and the bevel of the top of the shank rendering such shank capable of being easily detached from or attached to the socket. A shank of this description will be found described in the specification of Letters Patent No. 10438 and bearing date January 31st 1854 such Letters Patent having been granted to me.

In my present improvement I arrange in the socket tube the sustaining groove of the holding spring of the shank, but instead of placing it within the interior of the socket, I form it in the exterior of the socket tube and so as to extend around the head of it as seen at, $c$, in Figs. 4, and 5, which respectively denote a separate side view and section of the socket tube. At the two ends of this groove, I form orifices or passages, $d$, $d$, extending into the socket, such orifices and such grooves being made to receive a horse shoe or U spring, $g$, formed as seen in the drawings, the end of such spring being made to project within the socket and so as not only to retain the spring in place in the groove of the socket tube but to pass into the groove of the shank. The above I find to be an excellent mode of applying the spring to the socket tube of the shank, it being a mode of arranging and applying the spring in its socket, cheaper and more convenient in some respects than that exhibited in my said patent. Besides this, the action of the spring is improved to what it would be were it a coiled or wound spring arranged within the interior of the socket.

I do not claim making the shank of the caster detachable from its socket; nor do I claim the employment of a spring to hold it in the socket; nor the arrangement of said spring in a groove made in and around the shank and making the spring to bear against the internal surface of the socket made without a groove; nor do I herein claim the arrangement of the sustaining groove of the spring in the socket instead of in the shank, so that when the shank is being drawn out of the socket, or when it is within or out of the same, the spring will remain in the socket, but What I do claim is—

The herein before described mode of arranging or applying the spring and the sustaining groove or recess thereof, to the socket tube and the shank, the sustaining groove of the spring being formed in the outer surface of the socket tube, and the spring being made to embrace the socket tube and project through it and into the groove of the shank all substantially as hereinbefore specified.

In testimony whereof I have hereunto set my signature this twenty first day of March, A. D. 1854.

LE ROY S. WHITE.

Witnesses:
O. A. SEAMANS,
J. C. FOSTER.